(12) United States Patent
Sarin

(10) Patent No.: US 11,068,611 B1
(45) Date of Patent: Jul. 20, 2021

(54) SYSTEMS AND METHODS FOR PREVENTING DATA LOSS FROM DATA CONTAINERS

(71) Applicant: CA, Inc., San Jose, CA (US)

(72) Inventor: Sumit Sarin, Pune (IN)

(73) Assignee: CA, Inc., San Jose, CA (US)

( * ) Notice: Subject to any disclaimer, the term of this patent is extended or adjusted under 35 U.S.C. 154(b) by 197 days.

(21) Appl. No.: 16/050,211

(22) Filed: Jul. 31, 2018

(51) Int. Cl.
*H04L 29/06* (2006.01)
*G06F 21/62* (2013.01)
*G06F 21/60* (2013.01)
*G06F 16/13* (2019.01)

(52) U.S. Cl.
CPC .......... *G06F 21/6218* (2013.01); *G06F 16/13* (2019.01); *G06F 21/602* (2013.01); *G06F 21/604* (2013.01)

(58) Field of Classification Search
CPC ...... H04L 63/10; H04L 63/1408; G06F 21/60
See application file for complete search history.

(56) References Cited

U.S. PATENT DOCUMENTS

| | | | |
|---|---|---|---|
| 7,484,245 B1* | 1/2009 | Friedman | G06F 21/52 380/283 |
| 8,959,639 B2* | 2/2015 | Shevchenko | G06F 21/56 726/24 |
| 2009/0070878 A1* | 3/2009 | Wang | G06F 21/554 726/24 |
| 2010/0251369 A1* | 9/2010 | Grant | G06F 21/554 726/23 |
| 2015/0058997 A1* | 2/2015 | Lee | G06F 9/45558 726/26 |
| 2015/0096048 A1* | 4/2015 | Zhang | G06F 21/6218 726/27 |
| 2016/0085970 A1* | 3/2016 | Rebelo | G06F 21/34 726/25 |

* cited by examiner

*Primary Examiner* — Jason K Gee
(74) *Attorney, Agent, or Firm* — Foley & Lardner LLP

(57) ABSTRACT

The disclosed computer-implemented method for preventing data loss from data containers may include (1) identifying, at a computing device, a process running in a data container on the computing device, (2) intercepting an attempt by the process to exfiltrate information from the computing device via at least one of a file system operation or a network operation, and (3) performing a security action to prevent the intercepted attempt. Various other methods, systems, and computer-readable media are also disclosed.

20 Claims, 6 Drawing Sheets

US 11,068,611 B1

SYSTEMS AND METHODS FOR PREVENTING DATA LOSS FROM DATA CONTAINERS

BACKGROUND

Data containers may provide a convenient way to run programs in otherwise incompatible computing environments. Thus, software developers may use data containers to enable reliable software development and production across different software environments. For example, software developers may develop LINUX applications on computing devices running WINDOWS because some versions of WINDOWS allow native execution of LINUX binaries through container subsystems. In some instances, applications running in data containers may access local system resources such as storage devices and network interfaces of host computing systems. This access may enable malicious applications running in the data containers to exfiltrate sensitive information from the host computing systems.

Combating this form of exfiltration is not easy. LINUX environments may be dynamically-created on the host computing systems, thus installing and configuring data loss prevention (DLP) agents in each LINUX OS in the container to monitor applications is conventionally not practical or technically feasible. Further, identifying context of LINUX applications from outside the data containers and providing associated DLP and device control with a sufficient level of accuracy is very difficult. The instant disclosure, therefore, identifies and addresses a need for systems and methods for preventing data loss from data containers.

SUMMARY

As will be described in greater detail below, the instant disclosure describes various systems and methods for preventing data loss from data containers.

In one example, a method for preventing data loss from data containers may include (1) identifying, at a computing device, a process running in a data container on the computing device, (2) intercepting an attempt by the process to exfiltrate information from the computing device via at least one of a file system operation or a network operation, and (3) performing a security action to prevent the intercepted attempt.

In some examples, the data container may include (i.e., is implemented as) a LINUX container, a HYPER-V container, or a server container. In some embodiments, the method may include monitoring file system operations of the process and network operations of the process. In some examples, the attempt by the process to exfiltrate information may occur via the file system operation, where the file system operation includes at least one of an open operation, a read operation, or a write operation.

In some embodiments, the attempt by the process to exfiltrate information may occur via the network operation, where the network operation may include creating an Internet Protocol socket.

In some examples, the security action may be performed according to a data loss prevention (DLP) policy.

In an example, the attempt by the process to exfiltrate information may occur via the file system operation and performing the security action may further include at least one of (1) blocking the file system operation, (2) encrypting the information, (3) converting the file system operation to read-only, (4) blocking a write operation of the file system operation, (5) preventing the process from accessing a device that is external to the data container, and/or (6) inspecting the information to identify at least a portion of the information as sensitive information.

In some embodiments, the attempt by the process to exfiltrate information may occur via the network operation and performing the security action may further include at least one of (1) encrypting the information, (2) interrupting creating a socket, (3) preventing creating a socket, (4) blocking the network operation, (5) preventing the process from accessing a device that is external to the data container, (6) preventing the process from sending the information via a network coupled to the computing device, and/or (7) inspecting the information to identify at least a portion of the information as sensitive information.

In some examples, the data container may include a LINUX container and identifying may further include (1) identifying the process as a LINUX process due to an absence of a dynamic link library, a thread environment block, or a process environment block and (2) identifying a related minimal process external to the container.

In an embodiment, the data container may include a LINUX process and identifying may further include (1) identifying, from a minimal process identifier, an absence of the dynamic link library, a thread environment block, or a process environment block (2) identifying a memory-mapped image loaded by the process and (3) caching, from the memory-mapped image, at least one of a minimal process identifier, a LINUX process identification number, LINUX user information, or LINUX application information.

In an example, the data container may include a LINUX container and intercepting may further include (1) intercepting an application programming interface (API) call with a shim and (2) redirecting the API call to at least one of a DLP file system driver or a DLP network driver.

In some examples, the data container may include a LINUX container, the process may include a LINUX process, and the intercepting may include (1) interrupting process file access, (2) retrieving, from a cache, LINUX process characteristics including at least one of a minimal process identifier, a LINUX process identification number, LINUX user information, or LINUX application information, (3) identifying the LINUX process from the minimal process identifier, and (4) determining the LINUX process is not permitted to access a device external to the data container.

In some embodiments, the data container may include a LINUX container, the process may include a LINUX process, and the intercepting may include (1) interrupting an attempt by the process to write a file, (2) retrieving, from a cache, LINUX process characteristics including at least one of a minimal process identifier, a LINUX process identification number, LINUX user information, or LINUX application information, (3) identifying the LINUX process from the minimal process identifier, (4) identifying a presence of sensitive information in the file by inspecting the file, and (5) determining the LINUX process is not permitted to write the file to a device external to the data container.

In an example, the data container may include a LINUX container, the process may include a LINUX process, and the intercepting may include (1) interrupting an attempt by the process to read a file, (2) retrieving, from a cache, LINUX process characteristics including at least one of a minimal process identifier, a pico process identifier, a LINUX process identification number, LINUX user information, or LINUX application information, (3) identifying the LINUX process from the minimal process identifier, and (4) determining the LINUX process is not permitted to read the file.

In some examples, the data container may include a LINUX container, the process may include a LINUX process, and the intercepting may include (1) interrupting an attempt by the process to create an Internet Protocol socket, (2) retrieving, from a cache, LINUX process characteristics including at least one of a minimal process identifier, a LINUX process identification number, LINUX user information, or LINUX application information, (3) identifying the LINUX process from the minimal process identifier, and (4) determining the LINUX process is not permitted to connect to a device external to the data container.

In an example, a single DLP agent may identify the process, intercept the attempt, and perform the security action. The DLP agent may include modules for identifying the process, intercepting the attempt, and/or performing the security action. In some examples, identifying the process, intercepting the attempt, and performing the security action may be performed external to the data container.

In one embodiment, a system for preventing data loss from data containers may include at least one physical processor and physical memory that includes computer-executable instructions that, when executed by the physical processor, cause the physical processor to (1) identify a process running in a data container on the system, (2) intercept an attempt by the process to exfiltrate information from the system via at least one of a file system operation or a network operation, and (3) perform a security action to prevent the intercepted attempt.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a process running in a data container on the computing device, (2) intercept an attempt by the process to exfiltrate information from the computing device via at least one of a file system operation or a network operation, and (3) perform a security action to prevent the intercepted attempt.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
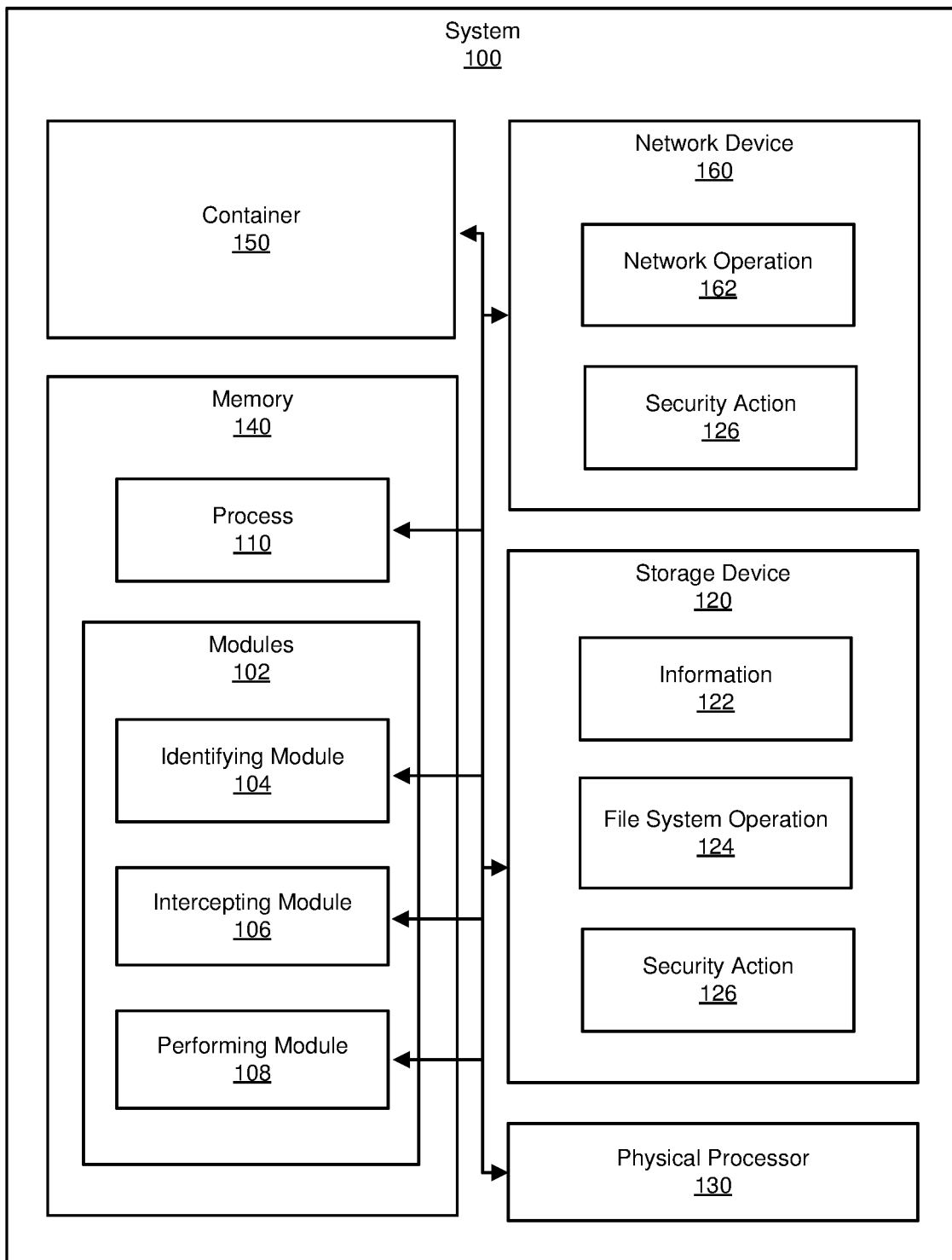
FIG. 1 is a block diagram of an example system for preventing data loss from data containers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing data loss from data containers. As will be explained in greater detail herein, disclosed systems and methods may automatically perform techniques that prevent, stop, and/or mitigate effects of data exfiltration attempts performed by processes executing inside containers within computing systems.

In some examples, a data loss protection (DLP) agent executing outside of a container may monitor creation of processes in the container and monitors attempts by the processes to communicate with devices and systems outside of the container. Data exfiltration efforts often involve accessing sensitive data stored on computing devices and then sending the sensitive data to other locations for further use. Monitored communications may include attempts to control devices external to the container, file system activities external to the container such as reading and writing, and/or network activities external to the container. When attempts are identified and intercepted, the DLP agent may identify the attempted communications as unauthorized and may perform security actions in response. Security actions may include blocking the attempt or limiting the attempt in some manner, such as permitting reading a file but not writing to the file. Monitoring communication attempts at peripheries of containers may beneficially enable using a single DLP agent to (1) monitor multiple processes within the container and/or (2) monitor multiple processes within multiple containers. Further, the systems and methods described herein may beneficially not require DLP agents to run inside the containers.

By doing so, the systems and methods described herein may improve the security of computing devices and/or provide targeted protection against malware, such as malware operating in containers. Examples of computing devices in which the provided techniques may be implemented include, and are not limited to, laptop computers, tablet computers, desktop computers, wearable computing devices (e.g., smart watches, smart glasses), smartphone devices, identify verification devices, access control devices, and/or smart televisions. As such, the provided techniques may advantageously protect users by beneficially reducing security risks posed by processes executing in containers. Further, the systems and methods described herein may beneficially reduce occurrences of malicious acts. Also, the systems and methods described herein may beneficially enable performing anti-malware acts. Further, the disclosed systems and methods are able to be implemented in many different types of computing devices.

Figure 2:
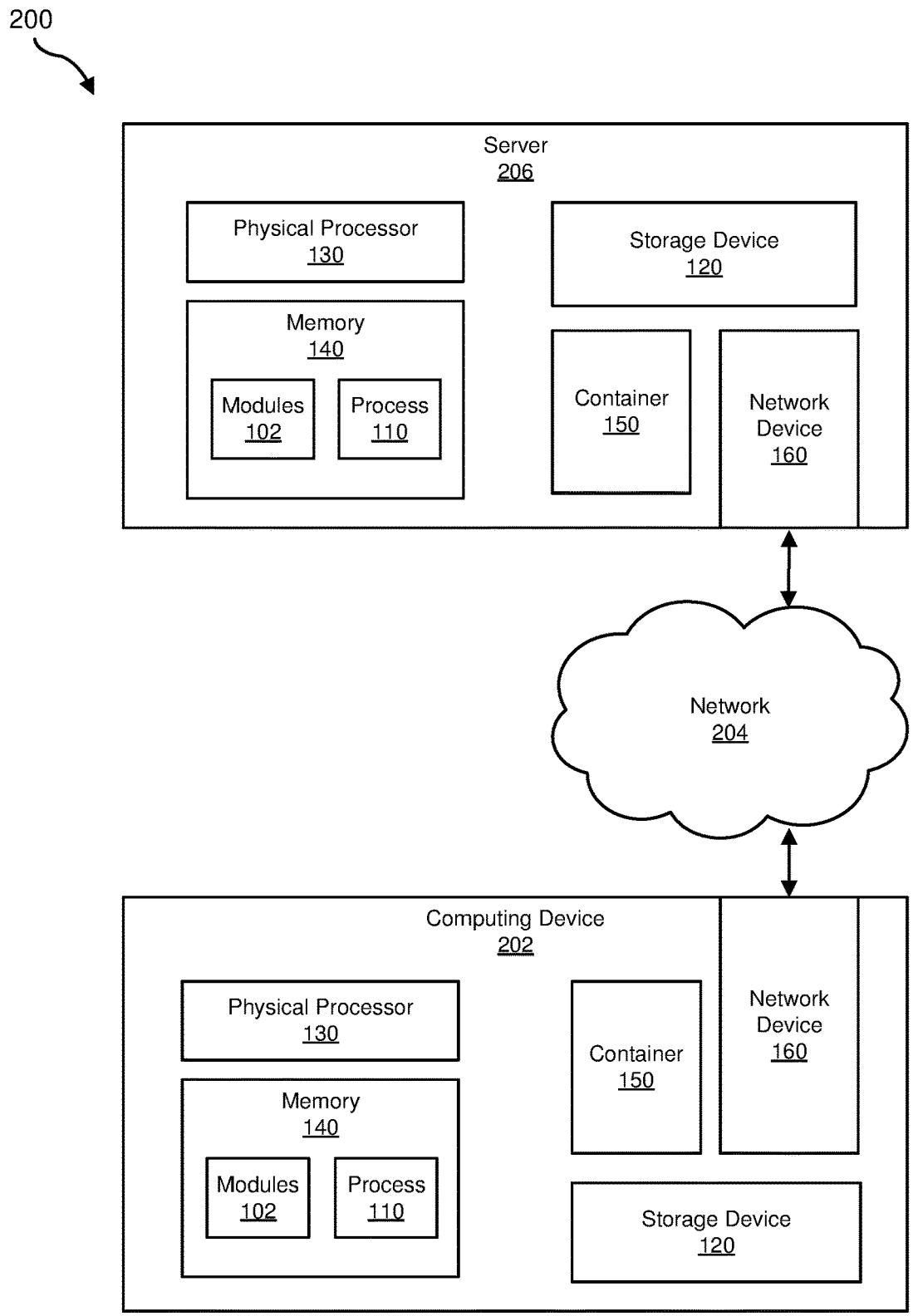
FIG. 2 is a block diagram of an additional example system for preventing data loss from data containers.
Figure 3:
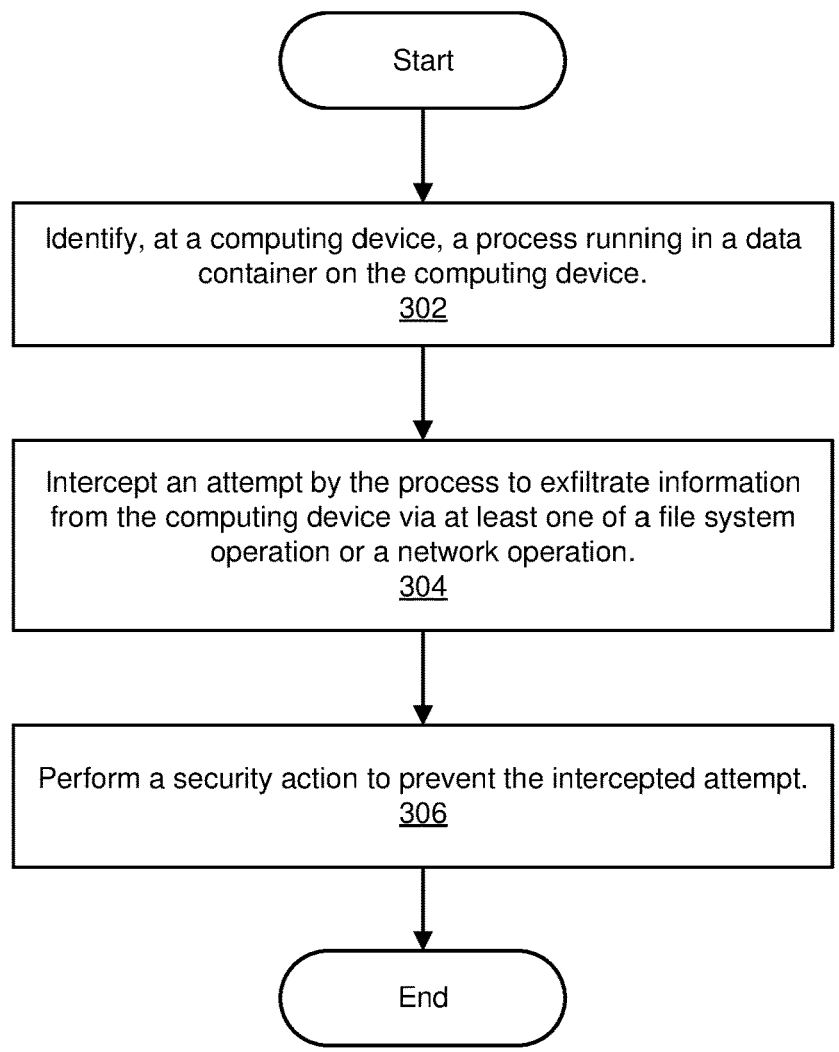
FIG. 3 is a flow diagram of an example method for preventing data loss from data containers.
Figure 4:
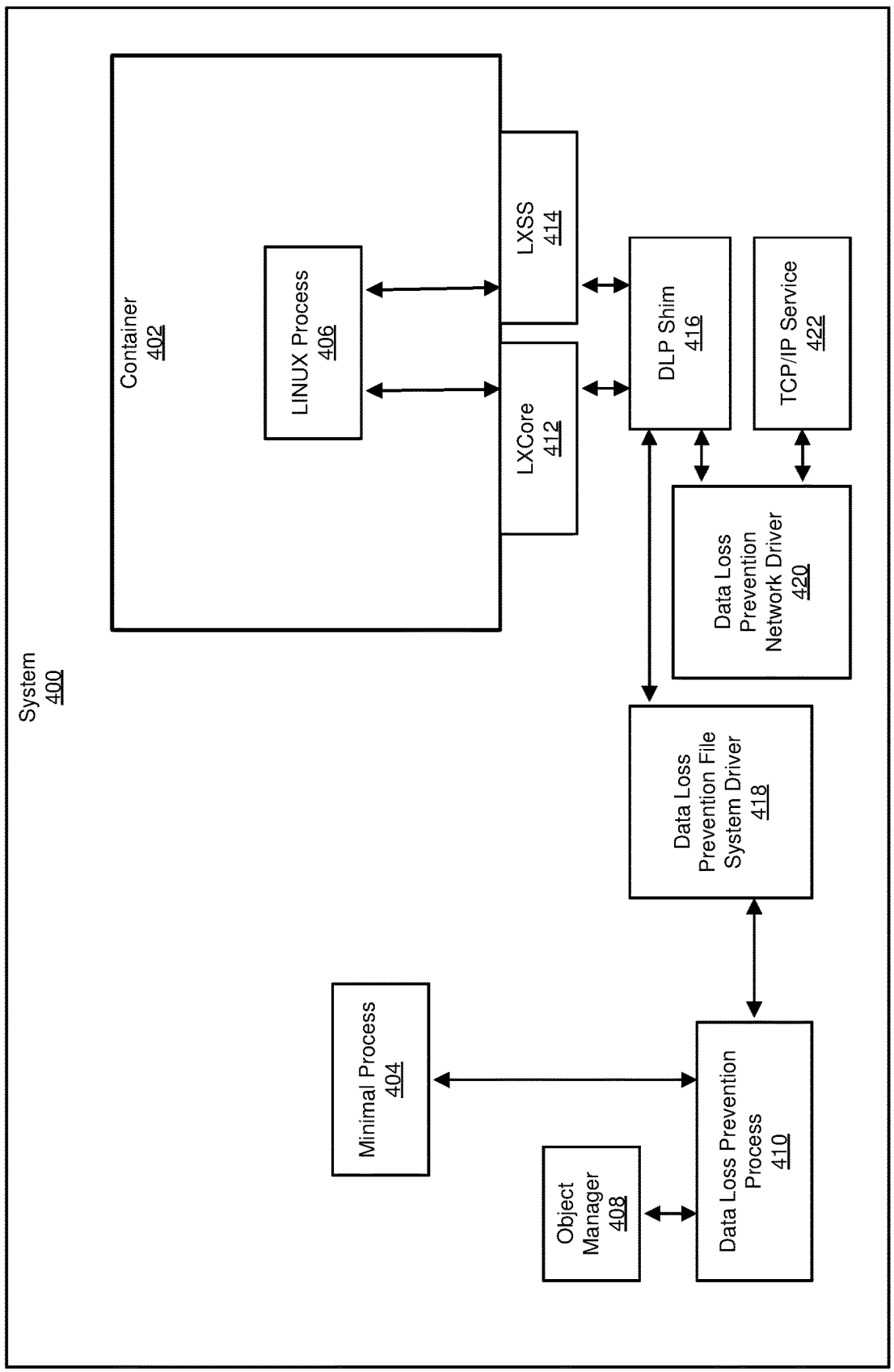
FIG. 4 is a block diagram of an example computer system for preventing data loss from data containers.

The following will provide, with reference to FIGS. 1-2 and 4, detailed descriptions of example systems for preventing data loss from data containers. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for preventing data loss from data containers. As illustrated in this figure, example system 100 may include one or more modules 102 for performing one or more tasks. As will be explained in greater detail below, modules 102 may include an identifying module 104, an intercepting module 106, and a performing module 108. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks. As illustrated in this figure, example system 100 may include process 110.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of information 122 (e.g., sensitive information), a file system operation 124, and/or a security action 126. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing data loss from data containers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102 and/or process 110. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. In examples, process 110 may be a LINUX process. In examples, process 110 may execute within container 150.

As illustrated in FIG. 1, example system 100 may also include one or more container devices, such as container 150. In some examples, container 150 may generally represent any type or form of stand-alone and executable computer-executable instructions that include at least minimal computer-executable instructions needed to execute regardless of an environment. In some embodiments, containers may be substantially isolated from each other. In some embodiments, containers may be substantially isolated from other computer-executable instructions stored and/or executed by computing devices executing the containers. In an example, containers may include LINUX containers, HYPER-V containers, and/or server containers.

As illustrated in FIG. 1, example system 100 may also include one or more network devices, such as network device 160. Network device 160 broadly represents any type or form of communication device or adapter capable of facilitating communication between example system 100 and one or more additional devices. For example, in certain embodiments network device 160 may facilitate communication between system 100 and a private or public network including additional computing systems. Examples of network device 160 include, without limitation, a wired network interface (such as a network interface card), a wireless network interface (such as a wireless network interface card), a modem, and any other suitable interface. In at least one embodiment, network device 160 may provide a direct connection to a remote server via a direct link to a network, such as the Internet and/or network 204 in FIG. 2. Network device 160 may also indirectly provide such a connection through, for example, a local area network (such as an Ethernet network), a personal area network, a telephone or cable network, a cellular telephone connection, a satellite data connection, or any other suitable connection. In examples, network device 160 may perform network operation 162 and/or security action 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to prevent data loss from data containers. For example, and as will be described in greater detail below, one or more of modules 102 may cause computing device 202 and/or server 206 to (1) identify process 110 running in memory 140 on system 100, (2) intercept an attempt by process 110 to exfiltrate information 122 from system 100 via at least one of file system operation 124 or network operation 162, and (3) perform security action 126 to prevent the intercepted attempt.

Computing device 202 generally represents any type or form of computing device capable of reading computer-executable instructions. In some examples, computing device 202 may represent a computer running DLP software and/or anti-malware software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. In some examples, computing device 202 may include container 150 and/or network device 160.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, computing server 206 may represent a computer running DLP software and/or anti-malware software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. In some examples, server 206 may include container 150 and/or network device 160.

FIG. 3 is a flow diagram of an example computer-implemented method 300 for preventing data loss from data containers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify processes running in data containers on computing devices. The systems described herein may perform step 302 in a variety of ways. In one example, identifying module 104 may, as a part of computing device 202 and/or server 206 in FIG. 2, identify process 110 running in memory 140 and/or container 150 on system 100. In an example, data containers may include LINUX containers, HYPER-V containers, and/or server containers. In some examples, method 300 may include monitoring file system operations of the processes running in data containers on computing devices and network operations of the processes running in data containers on computing devices.

In some embodiments, the provided systems and methods may track minimal processes and their creation on the systems in order to identify creation of LINUX processes within containers and in order to identify the specific LINUX processes. In some embodiments, the containers may be LINUX containers executing LINUX binaries through container subsystems in WINDOWS. In some examples, identifying processes within the LINUX containers may further include (1) identifying minimal processes by the absences of at least one of dynamic link libraries (e.g., NTDLLs), thread environment blocks (TEBs), and/or process environment blocks (PEBs) and (2) identifying the processes as LINUX processes due to the absences of the dynamic link libraries, the thread environment blocks, and/or the process environment blocks. In additional examples, identifying processes within the LINUX containers may further include (1) identifying memory-mapped images loaded by the processes and (2) caching (e.g., from the memory-mapped images), at least one of minimal process identifiers, LINUX process identification numbers, LINUX user information, and/or LINUX application information. The cache may be a pico-LINUX cache and/or may be located in LINUX application modules of DLP agents.

As illustrated in FIG. 3, at step 304 one or more of the systems described herein may intercept attempts by processes to exfiltrate information from computing devices via at least one of file system operations or network operations. The systems described herein may perform step 304 in a variety of ways. In one example, intercepting module 106 may, as a part of computing device 202 and/or server 206 in FIG. 2, intercept an attempt by process 110 to exfiltrate information 122 from system 100 via at least one of file system operation 124 or network operation 162.

In some examples, intercepting attempts by LINUX processes executing within the LINUX containers to exfiltrate information may further include (1) intercepting application programming interface (API) calls with shims and (2) redirecting the API calls to DLP file system drivers and/or DLP network drivers. In some examples, the shims may change arguments passed, handle operations, and/or redirect operations elsewhere (e.g., to a DLP agent). In some examples, the shims may ignore operations within containers.

In some examples, intercepting attempts by LINUX processes executing within the LINUX containers to exfiltrate information may further include (1) interrupting LINUX process file access, (2) retrieving, from caches, LINUX process characteristics including minimal process identifiers, LINUX process identification numbers, LINUX user information, and/or LINUX application information, (3) identifying the LINUX processes from the minimal process identifiers, and (4) determining the LINUX processes are not permitted to access devices (e.g., devices that are external to the LINUX containers).

In an example, the attempts by the processes to exfiltrate information may occur via file system operations. The file system operations by which the processes may attempt to exfiltrate information may include at least one of an open operation, a read operation, or a write operation.

In some embodiments, DLP policies may control levels of access by LINUX processes (e.g., based on LINUX process characteristics, etc.).

In some examples, intercepting attempts by LINUX processes executing within the LINUX containers to exfiltrate information may further include (1) interrupting attempts by the LINUX processes to write files, (2) retrieving, from caches, LINUX process characteristics including minimal process identifiers, LINUX process identification numbers, LINUX user information, and/or LINUX application information, (3) identifying the LINUX processes from the minimal process identifiers, (4) identifying presences of sensitive information in the files by inspecting the files, and (5) determining the LINUX processes are not permitted to write the files (e.g., to devices external to the LINUX containers).

In some examples, intercepting attempts by LINUX processes executing within the LINUX containers to exfiltrate information may further include (1) interrupting attempts by the LINUX processes to read files, (2) retrieving, from caches, LINUX process characteristics including minimal process identifiers, LINUX process identification numbers, LINUX user information, and/or LINUX application information, (3) identifying the LINUX processes from the minimal process identifiers, and (4) determining the LINUX processes are not permitted to read the files.

In some examples, the attempts by the processes to exfiltrate information may occur via network operations. In some examples, the attempts by the processes to exfiltrate information may occur via network operations such as creating an Internet Protocol socket.

In some examples, intercepting attempts by LINUX processes executing within the LINUX containers to exfiltrate information may further include (1) interrupting an attempt by the LINUX processes to create Internet Protocol sockets, (2) retrieving, from caches, LINUX process characteristics including minimal process identifiers, LINUX process identification numbers, LINUX user information, and/or LINUX application information, (3) identifying the LINUX processes from the minimal process identifiers, and (4) determining the LINUX processes are not permitted to connect (e.g., via networks) to devices (e.g., devices external to the data containers).

As illustrated in FIG. 3, at step 306 one or more of the systems described herein may perform security actions to prevent and/or mitigate intercepted attempts. The systems described herein may perform step 306 in a variety of ways. In one example, performing module 108 may, as a part of computing device 202 and/or server 206 in FIG. 2, perform security action 126 to prevent the intercepted attempt.

In some examples, the security actions may be performed according to DLP policies. Example security actions may include blocking access to devices (e.g., storage devices, memories, network devices, etc.), allowing limited access to devices, allowing read-only access to devices, encrypting information, and/or other acts limiting access to devices. In some examples, security actions may be performed automatically. In some embodiments, security actions may be performed based on a level of sensitivity of information that processes executing within containers may attempt to transfer.

In some embodiments, security actions may attempt to identify and/or ameliorate potential security risks posed by processes executing in containers. In some examples, security actions many include blocking access to and/or by the processes executing in containers. For example, computing device 202 and/or server 206 may block unauthorized access to a device and/or a file by process 110. In additional examples, the security actions may include displaying, on user displays, warnings indicating that processes are potentially malicious. In some examples, security action 126 may include displaying, on a user display, an indication that process 110 is attempting unauthorized access of a device and/or a file. In some examples, the security actions may further include allowing the processes access to information that only authenticated processes may access.

In some examples, countering data loss via file system operations may include security actions such as at least one of (1) blocking the file system operations, (2) encrypting the information, (3) converting the file system operations to read-only, (4) blocking write operations of the file system operations, (5) preventing the processes from accessing devices that are external to the data containers, and/or (6) inspecting the information to identify at least portions of the information as sensitive information.

In some examples, countering data loss via network operations may include security actions such as at least one of (1) encrypting the information, (2) interrupting creating sockets, (3) preventing creating sockets, (4) blocking the network operations, (5) preventing the processes from accessing devices that are external to the data containers, (6) preventing the processes from sending the information via networks coupled to computing devices, and/or (7) inspecting the information to identify at least portions of the information as sensitive information.

In some examples, a single DLP agent running on a system may identify the process, intercept the attempt, and perform the security action. In some examples, at least one DLP agent running on a system outside of a container may identify the process, intercept the attempt, and perform the security action. Further, in some embodiments, identifying the process, intercepting the attempt, and performing the security action may be performed external to the data containers.

As detailed above, the steps outlined in method 300 in FIG. 3 may prevent, stop, and/or mitigate effects of data exfiltration attempts performed by processes executing inside containers within computing systems. By doing so, the systems and methods described herein may protect users by beneficially reducing occurrences of data exfiltration by processes executing in containers.

FIG. 4 is a block diagram of an example computer system 400 for preventing data loss from data containers. In some embodiments, example computer system 400 may execute versions of WINDOWS that allow native execution of LINUX binaries through container subsystems. In some instances, LINUX binaries running in data containers may attempt to access local system resources of example computer system 400 such as storage devices and network interfaces.

As illustrated in this figure, example computer system 400 may include one or more modules for performing one or more tasks. In some examples, blocks depicted in FIG. 4 may be stored in memory of example computer system 400 and/or a storage device of example computer system 400. In some examples, computer system 400 may include a container 402. System 400 may include a minimal process 404 and at least one LINUX process 406. Computer system 400 may further include modules such as an object manager 408, a data loss prevention process 410, an LXCore kernel mode driver 412, an LXSS kernel mode driver 414, a data loss prevention shim 416, a data loss prevention file system driver 418, a data loss prevention network driver 420, and/or a Transmission Control Protocol/Internet Protocol (TCP/IP) service 422. In some examples, Pico Providers like LXCore kernel mode driver 412 and LXSS kernel mode driver 414 may create container 402 to enable executing LINUX process 406.

Although illustrated as separate elements, one or more of modules in FIG. 4 may represent portions of a single module or application. In certain embodiments, one or more of modules in FIG. 4 may represent one or more software applications or programs that, when executed by a computing device, may cause the computing device to perform one or more tasks. For example, and as will be described in greater detail herein, one or more of modules in FIG. 4 may represent modules stored and configured to run on one or more computing devices, such as the devices illustrated in FIG. 2 (e.g., computing device 202 and/or server 206). One or more of modules in FIG. 4 may also represent all or portions of one or more special-purpose computers configured to perform one or more tasks.

In some examples, example computer system 400 may identify creation of LINUX process 406 by identifying characteristics of minimal process 404. For example, object manager 408 notifies DLP process 410 via a callback when a minimal process is being created. When minimal process 404 is created without NTDLLs, TEBs, and/or PEBs, then DLP process 410 identifies minimal process 404 as a minimal process due to the lack of associated NTDLLs, TEBs, and/or PEBs. The DLP process 410 may identify memory-mapped images loaded by minimal process 404 to identify a Linux process that will execute in container 402 and cache (e.g., from the memory-mapped images), at least one of minimal process identifiers, LINUX process identification numbers, LINUX user information, and/or LINUX application information associated with minimal process 404 for later use. The cache may be a pico-LINUX cache.

In some examples, example computer system 400 may intercept file system operations and/or networking operations of LINUX process 406 to protect example computer system 400 from exfiltration of information. In some examples, example computer system 400 may intercept attempts by LINUX process 406 executing within container 402 to exfiltrate information from example computer system 400.

In some examples, DLP shim 416 may intercept and may interrupt attempts by LINUX process 406 to exfiltrate information by writing files (e.g., to a storage device serving example computer system 400), such as by a DrvFs filesystem plugin to the WINDOWS Subsystem for LINUX (WSL). The DrvFs plugin may enable mounting drives in WSL and enable a LINUX process to access file functions in WINDOWS, thus activities of the DrvFs plugin may be monitored. DLP shim 416 may redirect write operations from LINUX process 406 to DLP process 410 and/or DLP file system driver 418. In response to the redirection, DLP process 410 and/or DLP file system driver 418 may retrieve, from a cache, LINUX process characteristics including minimal process identifiers, LINUX process identification numbers, LINUX user information, and/or LINUX application information. DLP process 410 and/or DLP file system driver 418 may identify LINUX process 406 from the retrieved minimal process identifiers. DLP process 410 and/or DLP file system driver 418 may identify, by inspecting the files the files that LINUX process 406 is attempting to write, a presence of sensitive information in the files. DLP process 410 and/or DLP file system driver 418 may determine that LINUX process 406 is not permitted to write the files (e.g., to devices external to the LINUX containers) and may take a security action in response. File system operations by LINUX process 406 that are internal to container 402 (e.g., VolFs, TmpFs, ProcFs, and SysFs) need not be monitored by DLP process 410, as these file system operations are internal to container 402 and thus do not result in exfiltration of data from example computer system 400.

In some examples, DLP shim 416 may intercept and may interrupt attempts by LINUX process 406 to exfiltrate information by reading files (e.g., from a storage device serving example computer system 400), such as by the DrvFs filesystem plugin to the WSL. DLP shim 416 may redirect file read operations from LINUX process 406 to DLP process 410 and/or DLP file system driver 418. In response to the redirection, DLP process 410 and/or DLP file system driver 418 may retrieve, from a cache, LINUX process characteristics including minimal process identifiers, LINUX process identification numbers, LINUX user information, and/or LINUX application information. DLP process 410 and/or DLP file system driver 418 may identify LINUX process 406 from the retrieved minimal process identifiers. DLP process 410 and/or DLP file system driver 418 may determine LINUX process 406 is not permitted to read the files and may take a security action in response.

In some embodiments, LINUX process 406 may attempt to create sockets and use those sockets to exfiltrate sensitive information. In some examples, DLP shim 416 may identify the type of sockets that LINUX process 406 may attempt to create, may intercept creating the sockets, may redirect the creating operation to DLP network driver 420, may identify sources and/or destinations of the desired sockets, and may interrupt attempts by LINUX process 406 to exfiltrate information by creating sockets (e.g., an Internet Protocol socket used to make external communications) in TCP/IP service 422 to access a network-coupled devices (e.g., network 204, network 650, etc.). In some examples, DLP shim 416 may redirect network operations from LINUX process 406 to DLP process 410 and/or DLP network driver 420. In response to the redirection, DLP process 410 and/or DLP network driver 420 may retrieve, from a cache, LINUX process characteristics including minimal process identifiers, LINUX process identification numbers, LINUX user information, and/or LINUX application information. DLP process 410 and/or DLP network driver 420 may identify LINUX process 406 from the retrieved minimal process identifiers. DLP process 410 and/or DLP network driver 420 may determine LINUX process 406 is not permitted to connect (e.g., via networks) to devices (e.g., devices external to the data containers) and may take a security action in response.

Figure 5:
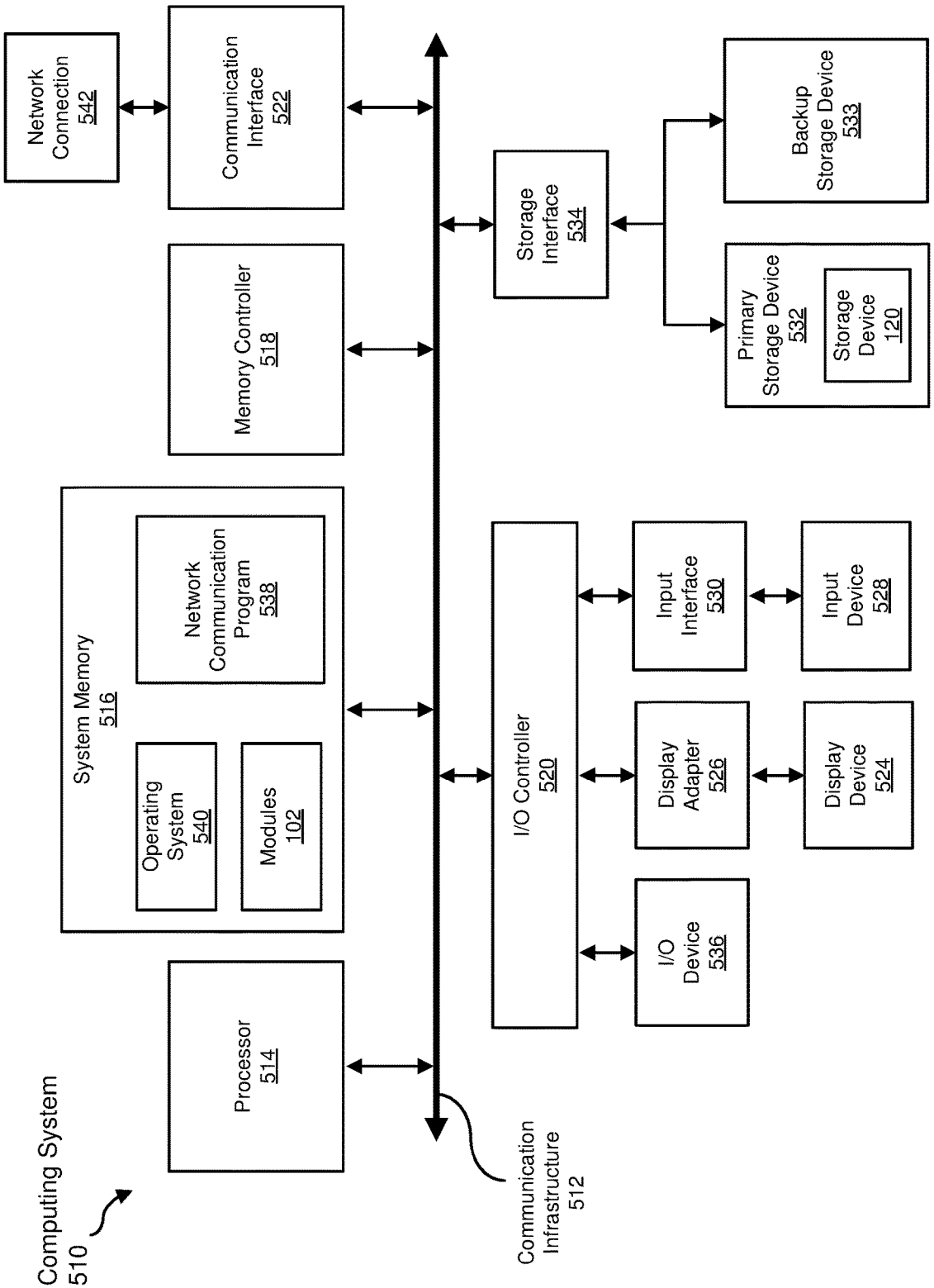
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, storage device 120 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
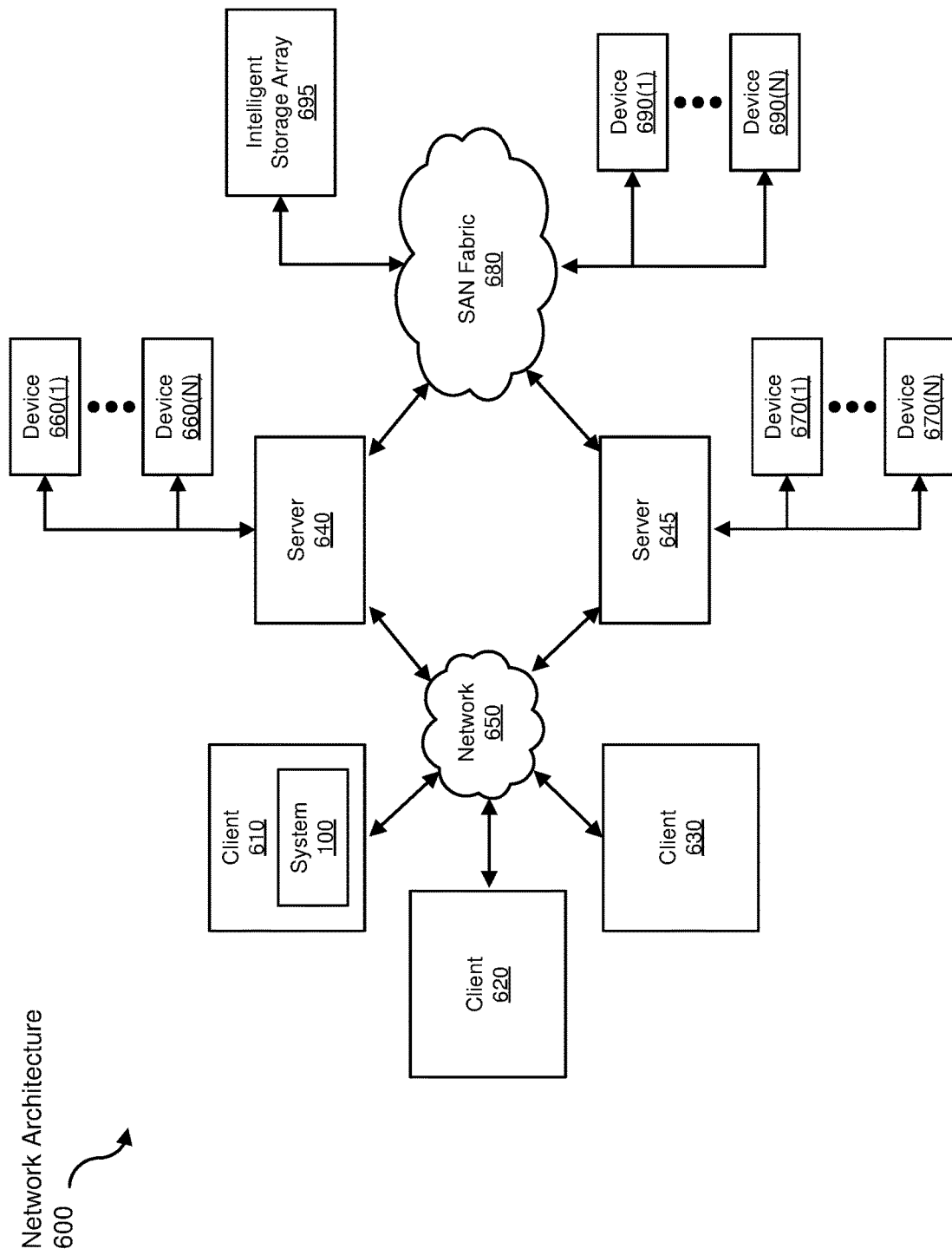
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N)

and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for preventing data loss from data containers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, DLP systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive process-related data to be transformed, transform the process-related data, output a result of the transformation to a user display, use the result of the transformation to determine that a security action must be performed, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing data loss from data containers, at least a portion of the method being performed by a computing device comprising at least one processor, the method comprising:
   identifying, at the computing device, a process running in a data container on the computing device;
   identifying the process as a minimal process due to absence of at least one of a dynamic link library, a thread environment block, or a process environment block;
   intercepting an attempt by the process to exfiltrate information from the computing device via at least one of a file system operation or a network operation, wherein intercepting comprises:
      intercepting an application programming interface (API) call with a shim; and
      redirecting, from the shim, the API call to at least one of a data loss prevention file system driver or a data loss prevention network driver; and
   performing a security action to prevent the intercepted attempt.

2. The computer-implemented method of claim 1, wherein the data container comprises a server container.

3. The computer-implemented method of claim 1, further comprising monitoring file system operations of the process and network operations of the process.

4. The computer-implemented method of claim 1, wherein the attempt by the process to exfiltrate information occurs via the file system operation and the file system operation comprises at least one of an open operation, a read operation, or a write operation.

5. The computer-implemented method of claim 1, wherein the attempt by the process to exfiltrate information occurs via the network operation and the network operation includes creating an Internet Protocol socket.

6. The computer-implemented method of claim 1, wherein the security action is performed according to a data loss prevention policy.

7. The computer-implemented method of claim 1, wherein the attempt by the process to exfiltrate information occurs via the file system operation and performing the security action further comprises at least one of:
   blocking the file system operation;
   encrypting the information;
   converting the file system operation to read-only;
   blocking a write operation of the file system operation;
   preventing the process from accessing a device that is external to the data container; or
   inspecting the information to identify at least a portion of the information as sensitive information.

8. The computer-implemented method of claim 1, wherein the attempt by the process to exfiltrate information occurs via the network operation and performing the security action further comprises at least one of:
   encrypting the information;
   interrupting creating a socket;

preventing creating a socket;
blocking the network operation;
preventing the process from accessing a device that is external to the data container;
preventing the process from sending the information via a network coupled to the computing device; or
inspecting the information to identify at least a portion of the information as sensitive information.

9. The computer-implemented method of claim 1, wherein identifying further comprises identifying a related minimal process external to the container.

10. The computer-implemented method of claim 1, wherein identifying further comprises:
identifying a memory-mapped image loaded by the process; and
caching, from the memory-mapped image, a minimal process identifier.

11. The computer-implemented method of claim 1, wherein the API call is a write operation configured to write a file from the data container to a storage device that is external to the data container.

12. The computer-implemented method of claim 1, wherein the intercepting further comprises:
interrupting process file access;
retrieving, from a cache, a minimal process identifier;
identifying the process from the minimal process identifier; and
determining the process is not permitted to access a device external to the data container.

13. The computer-implemented method of claim 1, wherein the intercepting further comprises:
interrupting an attempt by the process to write a file;
retrieving, from a cache, a minimal process identifier;
identifying the process from the minimal process identifier;
identifying a presence of sensitive information in the file by inspecting the file; and
determining the process is not permitted to write the file to a device external to the data container.

14. The computer-implemented method of claim 1, wherein the intercepting further comprises:
interrupting an attempt by the process to read a file;
retrieving, from a cache, a minimal process identifier;
identifying the process from the minimal process identifier; and
determining the process is not permitted to read the file.

15. The computer-implemented method of claim 1, wherein the intercepting further comprises:
interrupting an attempt by the process to create an Internet Protocol socket;
retrieving, from a cache, a minimal process identifier;
identifying the process from the minimal process identifiers; and
determining the process is not permitted to connect to a device external to the data container.

16. The computer-implemented method of claim 1, wherein a single data loss prevention agent identifies the process, intercepts the attempt, and performs the security action.

17. The computer-implemented method of claim 1, wherein identifying the process, intercepting the attempt, and performing the security action are performed external to the data container.

18. A system for preventing data loss from data containers, the system comprising:
at least one physical processor; and
physical memory comprising computer-executable instructions that, when executed by the physical processor, cause the physical processor to:
identify a process running in a data container on the system;
identify the process as a minimal process due to absence of at least one of a dynamic link library, a thread environment block, or a process environment block;
intercept an attempt by the process to exfiltrate information from the system via at least one of a file system operation or a network operation, wherein intercepting comprises:
intercepting an application programming interface (API) call with a shim; and
redirecting, from the shim, the API call to at least one of a data loss prevention file system driver or a data loss prevention network driver; and
perform a security action to prevent the intercepted attempt.

19. The system of claim 18, further comprising computer-executable instructions that, when executed by the physical processor, cause the physical processor to identify a related minimal process external to the container.

20. A non-transitory computer-readable medium comprising one or more computer-executable instructions that, when executed by at least one processor of a computing device, cause the computing device to:
identify a process running in a data container on the computing device;
identify the process as a minimal process due to absence of at least one of a dynamic link library, a thread environment block, or a process environment block;
intercept an attempt by the process to exfiltrate information from the computing device via at least one of a file system operation or a network operation, wherein intercepting comprises:
intercepting an application programming interface (API) call with a shim; and
redirecting, from the shim, the API call to at least one of a data loss prevention file system driver or a data loss prevention network driver; and
perform a security action to prevent the intercepted attempt.

* * * * *